(12) United States Patent
Xu et al.

(10) Patent No.: US 10,419,776 B2
(45) Date of Patent: Sep. 17, 2019

(54) HIGH LEVEL SYNTAX IMPROVEMENT ON INTER-LAYER PREDICTION FOR SHVC/MV-HEVC

(71) Applicant: SONY CORPORATION, Tokyo (JP)

(72) Inventors: Jun Xu, Sunnyvale, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 998 days.

(21) Appl. No.: 14/325,610

(22) Filed: Jul. 8, 2014

(65) Prior Publication Data

US 2015/0016519 A1 Jan. 15, 2015

Related U.S. Application Data

(60) Provisional application No. 61/844,219, filed on Jul. 9, 2013, provisional application No. 61/846,545, filed (Continued)

(51) Int. Cl.
*H04N 19/503* (2014.01)
*H04N 19/70* (2014.01)
(Continued)

(52) U.S. Cl.
CPC ......... *H04N 19/503* (2014.11); *H04N 19/105* (2014.11); *H04N 19/172* (2014.11);
(Continued)

(58) Field of Classification Search
CPC .. H04N 19/503; H04N 19/105; H04N 19/172; H04N 19/174; H04N 19/187;
(Continued)

(56) References Cited

U.S. PATENT DOCUMENTS 8,660,179 B2 * 2/2014 Koo .................. H04N 19/597
375/240.12
2012/0287999 A1 11/2012 Li et al.
(Continued)

FOREIGN PATENT DOCUMENTS

WO 2001089227 A1 11/2001
WO 2012097749 A1 7/2012
(Continued)

OTHER PUBLICATIONS

United States Patent and Trademark Office, International Search Report and Written Opinion dated Nov. 14, 2014 for corresponding International Patent Application No. PCTUS14/45677 (pp. 1-12) and PCT claims (pp. 13-17) pp. 1-17.
(Continued)

*Primary Examiner* — Tung T Vo
*Assistant Examiner* — Joseph W Becker
(74) *Attorney, Agent, or Firm* — Chip Law Group

(57) ABSTRACT

Syntax changes for SHVC/MV-HEVC coding apparatus and methods are described which improve efficiency. In a first portion, syntax of header signaling position under P or B-slice conditions are described, and a new condition to signal inter-layer prediction layer. A second portion describes use of an inter-layer reference picture set as an alternative to the first portion, and provides an arranged syntax to more efficiently signal inter-layer reference information. In a third portion, an inter-layer sample only prediction and TMVP interaction is described which reduces signaling needs for collocated references syntax.

5 Claims, 9 Drawing Sheets

Related U.S. Application Data on Jul. 15, 2013, provisional application No. 61/858,312, filed on Jul. 25, 2013.

(51) Int. Cl.

| | |
|---|---|
| *H04N 19/30* | (2014.01) |
| *H04N 19/174* | (2014.01) |
| *H04N 19/105* | (2014.01) |
| *H04N 19/52* | (2014.01) |
| *H04N 19/172* | (2014.01) |
| *H04N 19/463* | (2014.01) |
| *H04N 19/187* | (2014.01) |
| *H04N 19/573* | (2014.01) |
| *H04N 19/58* | (2014.01) |

(52) U.S. Cl.
CPC ......... *H04N 19/174* (2014.11); *H04N 19/187* (2014.11); *H04N 19/30* (2014.11); *H04N 19/463* (2014.11); *H04N 19/52* (2014.11); *H04N 19/573* (2014.11); *H04N 19/58* (2014.11); *H04N 19/70* (2014.11)

(58) Field of Classification Search
CPC ...... H04N 19/30; H04N 19/463; H04N 19/52; H04N 19/573; H04N 19/58; H04N 19/70
USPC .................................................... 375/240.12
See application file for complete search history.

(56) References Cited

U.S. PATENT DOCUMENTS

| | | |
|---|---|---|
| 2013/0034170 A1 | 2/2013 | Chen et al. |
| 2013/0114742 A1 | 5/2013 | Hannuksela et al. |
| 2013/0208792 A1 | 8/2013 | He et al. |
| 2013/0336407 A1 | 12/2013 | Chen et al. |
| 2014/0016701 A1* | 1/2014 | Chen .................... H04N 19/105 375/240.14 |

FOREIGN PATENT DOCUMENTS

| | | |
|---|---|---|
| WO | 2013070353 A1 | 5/2013 |
| WO | 2013108616 A1 | 7/2013 |

OTHER PUBLICATIONS

Kannangara et al. "Low Complexity Skip Prediction for H.264 through Lagrangian Cost Estimation" IEEE Transactions on Circuits and Systems for Video Technology, vol. 16, No. 2; Publication online Feb. 6, 2006. [Retrieved on Oct. 13, 2014] Retrieved from: <URL:http://ieeexxplore.ieee.org/xpl/login.jsp?:p=&arnumber=1588960>; pp. 202-208.

* cited by examiner

Reference Layer Number Check

| | | Descriptor |
|---|---|---|
| 01 | slice_segment_header( ) { | |
| 02 | ... | |
| 03 | ~~if( nuh_layer_id > 0 && NumDirectRefLayers[ nuh_layer_id ] > 0 ) {~~ | |
| 04 | ~~inter_layer_pred_enabled_flag~~ | ~~u(1)~~ |
| 05 | ~~if( inter_layer_pred_enabled_flag && NumDirectRefLayers[ nuh_layer_id] > 1) {~~ | |
| 06 | ~~if( !max_one_active_ref_layer_flag )~~ | |
| 07 | ~~num_inter_layer_ref_pics_minus1~~ | ~~u(v)~~ |
| 08 | ~~for( i = 0; i < NumActiveRefLayerPics; i++ )~~ | |
| 09 | ~~inter_layer_pred_layer_idc[ i ]~~ | ~~u(v)~~ |
| 10 | ~~}~~ | |
| 11 | ~~}~~ | |
| 12 | ~~if( NumSamplePredRefLayers[ nuh_layer_id] > 0 && NumActiveRefLayerPics > 0 )~~ | |
| 13 | ~~inter_layer_sample_pred_only_flag~~ | ~~u(1)~~ |
| 14 | if( sample_adaptive_offset_enabled_flag ) { | |
| 15 | slice_sao_luma_flag | u(1) |
| 16 | slice_sao_chroma_flag | u(1) |
| 17 | } | |
| 18 | if( slice_type == P \|\| slice_type == B ) { | |
| 19 | if( nuh_layer_id > 0 && NumDirectRefLayers[ nuh_layer_id ] > 0 ) { | |
| 20 | inter_lay er_pred_enabled_flag | u(1) |
| 21 | if( inter_layer_pred_enabled_flag &&NumDirectRefLayers[ nuh_layer_id] > 1) { | |
| 22 | if( !max_one_active_ref_layer_flag ) | |
| 23 | num_inter_layer_ref_pics_minus1 | u(v) |
| 24 | if( NumDirectRefLayers[ nuh_layer_id ] != NumActiveRefLayerPics ) | |
| 25 | for( i = 0; i < NumActiveRefLayerPics; i++ ) | |
| 26 | inter_layer_pred_layer_idc[ i ] | u(v) |
| 27 | } | |
| 28 | } | |
| 29 | if( NumSamplePredRefLayers[ nuh_layer_id] > 0 && NumActiveRefLayerPics > 0 ) | |
| 30 | inter_layer_sample_pred_only_flag | u(1) |
| 31 | num_ref_idx_active_override_flag | u(1) |
| 32 | ... | |
| 33 | } | |

FIG. 2

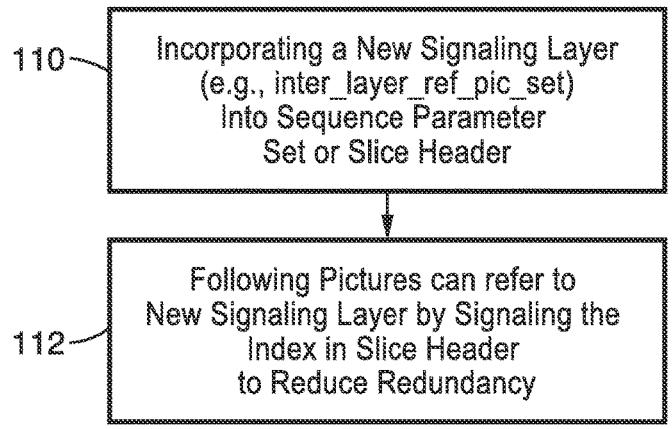

FIG. 3

Inter-Layer Reference Picture Set in Sequence Parameter Set RBSP Syntax

| | | Descriptor |
|---|---|---|
| 01 | seq_parameter_set_rbsp( ) { | |
| 02 | ... | |
| 03 | if( nuh_layer_id > 1 && NumDirectRefLayers[ nuh_layer_id ] > 0 ) { | |
| 04 | num_inter_layer_ref_pic_sets | ue(v) |
| 05 | for( i = 0; i < num_inter_layer_ref_pic_sets; i++) | |
| 06 | inter_layer_ref_pic_set( i ) | |
| 07 | } | |
| 08 | sps_temporal_mvp_enabled_flag | u(1) |
| 09 | strong_intra_smoothing_enabled_flag | u(1) |
| 10 | vui_parameters_present_flag | u(1) |
| 11 | if( vui_parameters_present_flag ) | |
| 12 | vui_parameters( ) | |
| 13 | sps_extension_flag | u(1) |
| 14 | if( sps_extension_flag ) | |
| 15 | while( more_rbsp_data( ) ) | |
| 16 | sps_extension_data_flag | u(1) |
| 17 | rbsp_trailing_bits( ) | |
| 18 | } | |

FIG. 4

Syntax of Inter-Layer Reference Picture Set

| | | Descriptor |
|---|---|---|
| 01 | inter_layer_ref_pic_set( stRpsIdx ) { | |
| 02 | num_inter_layer_ref_pics_minus1 | u(v) |
| 03 | for( i = 0; i <= num_inter_layer_ref_pics_minus1; i++ ) | |
| 04 | inter_layer_pred_layer_idc[ i ] | u(v) |
| 05 | } | |

FIG. 5

General Slice Segment Header Syntax Utilizing Inter-Layer Reference Picture Set

| 01 | slice_segment_header() { | Descriptor |
|---|---|---|
| 02 | ... | |
| 03 | ~~if( nuh_layer_id > 0 && NumDirectRefLayers[ nuh_layer_id ] > 0 ) {~~ | |
| 04 | ~~inter_layer_pred_enabled_flag~~ | ~~u(1)~~ |
| 05 | ~~if( inter_layer_pred_enabled_flag && NumDirectRefLayers[nuh_layer_id] > 1) {~~ | |
| 06 | ~~if(!max_one_active_ref_layer_flag)~~ | |
| 07 | ~~num_inter_layer_ref_pics_minus1~~ | ~~u(v)~~ |
| 08 | ~~for( i = 0; i < NumActiveRefLayerPics; i++ )~~ | |
| 09 | ~~inter_layer_pred_layer_idc[ i ]~~ | ~~u(v)~~ |
| 10 | ~~}~~ | |
| 11 | ~~}~~ | |
| 12 | ~~if(NumSamplePredRefLayers[ nuh_layer_id] > 0 && NumActiveRefLayerPics > 0 )~~ | |
| 13 | ~~inter_layer_sample_pred_only_flag~~ | ~~u(1)~~ |
| 14 | if( sample_adaptive_offset_enabled_flag ) { | |
| 15 |    slice_sao_luma_flag | u(1) |
| 16 |    slice_sao_chroma_flag | u(1) |
| 17 | } | |
| 18 | if( slice_type == P \|\| slice_type == B ) { | |
| 19 |    if( nuh_layer_id > 0 && NumDirectRefLayers[ nuh_layer_id ] > 0 ) { | |
| 20 |      inter_layer_pred_enabled_flag | u(1) |
| 21 |      if( inter_layer_pred_enabled_flag && NumDirectRefLayers[ nuh_layer_id] > 1) { | |
| 22 |        inter_layer_ref_pic_set_sps_flag | u(1) |
| 23 |        if(! inter_layer_ref_pic_set_sps_flag ) | |
| 24 |          inter_layer_ref_pic_set( num_inter_layer_ref_pic_sets ) | |
| 25 |        else if(num_inter_layer_ref_pic_sets > 1) | |
| 26 |          inter_layer_ref_pic_set_idx | u(v) |
| 27 |      } | |
| 28 |      if(NumActiveRefLayerPics > 0) | |
| 29 |        inter_layer_sample_pred_only_flag | u(1) |
| 30 |    } | |
| 31 | ... | |
| 32 | } | |

FIG. 6

General Slice Segment Header Syntax

| | | Descriptor |
|---|---|---|
| 01 | slice_segment_header( ) { | |
| 02 | ....... | |
| 03 |   if( slice_type == P \|\| slice_type == B ) { | |
| 04 | ....... | |
| 05 |     if(slice_temporal_mvp_enabled_flag && ! inter_layer_sample_pred_only_flag) { | |
| 06 |       if( nuh_layer_id > 0 && NumActiveMotionPredRefLayers > 0 ) | |
| 07 |         alt_collocated_indication_flag | u(1) |
| 08 |       if( alt_collocated_indication_flag) | |
| 09 |         if( NumActiveMotionPredRefLayers > 1 ) | |
| 10 |           collocated_ref_layer_idx | ue(v) |
| 11 |       else { | |
| 12 |         if( slice_type == B ) | |
| 13 |           collocated_from_l0_flag | u(1) |
| 14 |         if( ( collocated_from_l0_flag && num_ref_idx_l0_active_minus1 > 0) \|\| (!collocated_from_l0_flag && num_ref_idx_l1_active_minus1 > 0)) | |
| 15 |           collocated_ref_idx | ue(v) |
| 16 |       } | |
| 17 |     } | |
| 18 | ....... | |
| 19 | } | |

FIG. 9

Intermediate Variable Inter-Layer Sample Prediction Only Flag

| 01 | slice_segment_header( ) { | Descriptor |
|---|---|---|
| 02 | ....... | |
| 03 | if(slice_type == P \|\| slice_type == B) { | |
| 04 | ....... | |
| 05 | if(slice_temporal_mvp_enabled_flag && !inter_layer_sample_pred_only_flag) { | |
| 06 | if(nuh_layer_id > 0 && NumActiveMotionPredRefLayers > 0) | |
| 07 | alt_collocated_indication_flag | u(1) |
| 08 | if(alt_collocated_indication_flag) | |
| 09 | if(NumActiveMotionPredRefLayers > 1) | |
| 10 | collocated_ref_layer_idx | ue(v) |
| 11 | else { | |
| 12 | if(slice_type == B) | |
| 13 | collocated_from_l0_flag | u(1) |
| 14 | if((collocated_from_l0_flag && num_ref_idx_l0_active_minus1 > 0) \|\| (!collocated_from_l0_flag && num_ref_idx_l1_active_minus1 > 0)) | |
| 15 | collocated_ref_idx | ue(v) |
| 16 | } | |
| 17 | } | |
| 18 | ....... | |
| 19 | } | |

FIG. 10

HIGH LEVEL SYNTAX IMPROVEMENT ON INTER-LAYER PREDICTION FOR SHVC/MV-HEVC

CROSS-REFERENCE TO RELATED APPLICATIONS

This application claims priority to, and the benefit of, U.S. provisional patent application Ser. No. 61/844,219 filed on Jul. 9, 2013, incorporated herein by reference in its entirety, U.S. provisional patent application Ser. No. 61/846,545 filed on Jul. 15, 2013, incorporated herein by reference in its entirety, and U.S. provisional patent application Ser. No. 61/858,312 filed on Jul. 25, 2013, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to inter-layer prediction within a video encoder/decoder, and more particularly to syntax improvements for inter-layer prediction within HEVC coding systems.

2. Background Discussion

High Efficiency Video Coding (HEVC) is a video compression format which surpasses advanced video coding (AVC) standards (e.g., H.264/MPEG-4 AVC). HEVC is configured to substantially increase data compression ratio in comparison to AVC systems for a given level of video quality. A rapidly developing extension of HEVC is that of scalable HEVC (SHVC) in which the video is encoded with one or more subset bitstreams, to support different resolution end devices. Improvements are constantly being sought to further increase coding gains within HEVC and SHVC systems.

Accordingly, the present technology overcomes certain shortcomings of previous SHVC solutions and provides additional benefits.

BRIEF SUMMARY

SHVC improvements regarding inter-layer prediction related syntax are disclosed. The syntax of header signaling position under P or B-slice conditions are described, as well as adding a new condition to signal inter-layer prediction layer, which can be used singly or in combination towards reducing redundancy. An inter-layer reference picture set variable is described for arranging syntax, so that inter-layer reference information is more efficiently signaled. An inter-layer sample only prediction, and TMVP interaction, is described for reducing signaling need for collocated references syntax.

Further aspects of the present technology will be brought out in the following portions of the specification, wherein the detailed description is for the purpose of fully disclosing preferred embodiments of the present technology without placing limitations thereon.

BRIEF DESCRIPTION OF THE SEVERAL VIEWS OF THE DRAWING(S)

The description will be more fully understood by reference to the following drawings which are for illustrative purposes only:

FIG. 2 is a coding example of a reference layer number check performed according to an embodiment of the present description.

FIG. 3 is a flow diagram of utilizing a new signaling layer according to an embodiment of the present description.

FIG. 4 is a coding example of an inter-layer reference picture set in sequence parameter set RBSP syntax according to an embodiment of the present description.

FIG. 5 is a coding example of syntax for inter-layer reference picture set according to an embodiment of the present description.

FIG. 6 is a coding example of a general slice segment header syntax utilizing inter-layer reference picture set according to an embodiment of the present description.

FIG. 9 is a coding example of general slice segment header syntax according to an embodiment of the present description.

FIG. 10 is a coding example of an intermediate variable inter-layer sample prediction only flag according to an embodiment of the present description.

DETAILED DESCRIPTION

1. Redundancy Removal of Inter-Layer Prediction Related Syntax 1.1. Slice Type Checking.

A modification of the signaling position of the syntax under P or B-slice condition in the slice header is performed to reduce redundancy. In the current HEVC draft (at the time of this application), inter-layer reference is possible only in P-slice or B-slice and not allowed in I-slice.

It should be appreciated that I-slice allows only intra prediction, whereby all reference is from the same picture. P/B slice allows both intra and inter prediction, such that the reference could be from other pictures including: a temporal picture or a picture from other layers.

1.2. Reference Layer Number Check.

To reduce redundancy, a condition is added for signaling the performance of inter_layer_pred_layer_idc[i].

Currently, the number of reference layers is signaled in the video parameter set (VPS) and in the slice header. The former is for sequence-level dependency and the latter is for picture-level dependency. If the number of reference layers is the same between NumDirectRefLayers [nuh_layer_id] (sequence-level) and NumActiveRefLayerPics (picture-level), then the present technology considers it unnecessary to specify which layer to refer to. A condition is added in the present technology to avoid the redundant signaling.

Figure 1:
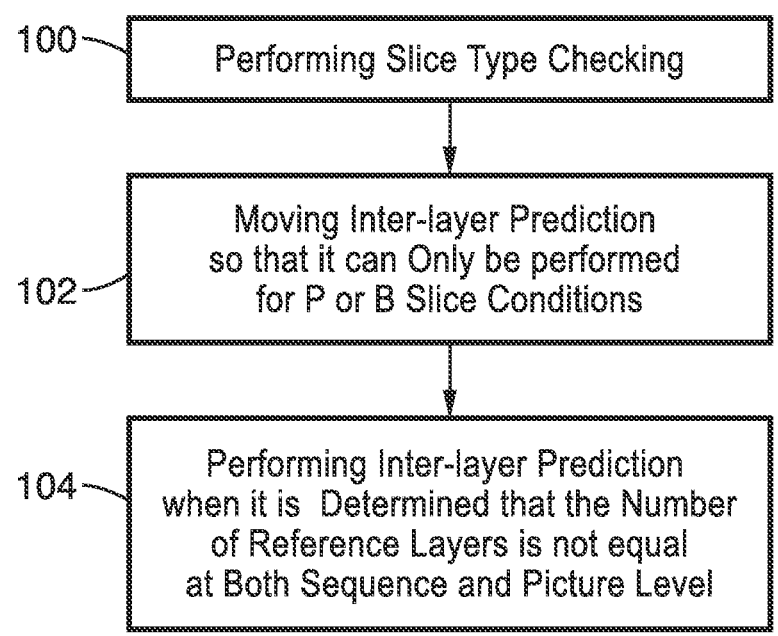
FIG. 1 is a flow diagram of redundancy removal of Inter-layer prediction syntax and signaling of equal number of reference layers according to an embodiment of the present description.

FIG. 1 illustrates a general flow diagram embodiment of redundancy removal of inter-layer prediction related syntax. Slice type checking 100 is performed with inter-layer prediction moved and performed 102 only under P or B slice conditions. Inter-layer prediction is then performed 104, when the number of reference layers is unequal between sequence and picture level.

FIG. 2 illustrates an example embodiment of the above changes, showing lines 01 through 33 in the slice segment header. The predictions, removed from lines 03-09 are only seen being performed under P or B slice conditions under line 18. Still further the inter-layer prediction layer idc is only performed when NumDirectRefLayers [nuh_layer_id] (sequence-level) and NumActiveRefLayerPics (picture-level), are not equal as seen in line 24.

The addition is seen in the last portion of FIG. 1, and allows eliminating the text shown in strikeout mode at the top portion of FIG. 1 in lines 3-13.

Variable inter_layer_pred_layer_idc[i] specifies the variable, RefPicLayerId[i], representing the nuh_layer_id of the i-th picture that may be used by the current picture for inter-layer prediction. The length of the syntax element inter_layer_pred_layer_idc[i] is Ceil(Log 2(NumDirectRefLayers[nuh_layer_id])) bits. The value of inter_layer_pred_layer_idc[i] shall be in the range of 0 to NumDirectRefLayers[nuh_layer_id]−1, inclusive. When not present, the value of inter_layer_pred_layer_idc[i] is inferred to be equal to i.

2. Signaling with an Inter-Layer Reference Picture Set.

A new inter_layer_ref_pic_set is proposed to arrange the syntax, toward more efficiently signaling inter-layer reference information like short_term_ref_pic_set. The inter_layer_ref_pic_set provides another mechanism for arranging inter-layer reference related syntax. Similar to the set of short_term_ref_pic_set, it is signaled in the sequence parameter set (SPS) and/or the slice header. When an inter_layer_ref_pic_set is signaled in the active SPS, the following pictures can refer the inter_layer_ref_pic_set by signaling the index in their slice header. This change reduces the redundancy when the inter-layer reference information is not negligible (e.g., multi-view case in MV/3D-HEVC). It is also provides for signaling a new parameter set in each slice header to increase flexibility.

FIG. 3 illustrates a generalized flowchart for the above process. A new signaling layer is incorporated 110, which can be utilized 112 by the following pictures in response to signaling their index.

FIG. 4 illustrates an example coding embodiment (lines 01-18) of signaling with the new inter-layer reference picture set, as seen at the top section of the figure, in lines 3 through 7 in which if the number layer id is greater than 1, and the number of direct reference layers is non-zero then the new signaling layer is initialized for all picture sets "i". The changed portions are marked in the figure with details emphasized. It should be appreciated that this signal aspect is a variation of reference layer number checking as described in the last section, wherein the aspects regarding point1 with NumActiveRefLayerPics equal to NumDirectRefLayers[nuh_layer_id], are included.

Referring to FIG. 4, num_inter_layer_ref_pic_sets specifies the number of inter_layer_ref_pic_set( ) syntax structures included in the SPS. The value of num_inter_layer_ref_pic_sets is preferably in the range of from 0 to 64, inclusive.

In at least one embodiment, a decoder is configured to allocate memory for a total number of num_inter_layer_ref_pic_sets+1 inter_layer_ref_pic_set( ) syntax structures since there may be an inter_layer_ref_pic_set( ) syntax structure directly signaled in the slice headers of a current picture. An inter_layer_ref_pic_set( ) syntax structure directly signaled in the slice headers of a current picture has an index equal to num_inter_layer_ref_pic_sets.

FIG. 5 illustrates an example coding embodiment (lines 01-05) of inter-layer reference picture set syntax. An inter_layer_ref_pic_set (stRpsIdx) syntax structure may be present in an SPS or in a slice header. Depending on whether the syntax structure is included in a slice header or an SPS, the following applies:

(a) If the syntax structure is present in a slice header, the inter_layer_ref_pic_set (stRpsIdx) syntax structure specifies the inter-layer RPS of the current picture (the picture containing the slice), and the following applies. (i) The content of the inter_layer_ref_pic_set (stRpsIdx) syntax structure shall be the same in all slice headers of the current picture. (ii) The value of stRpsIdx shall be equal to the syntax element num_inter_layer_ref_pic_sets in the active SPS. (iii) The inter-layer RPS of the current picture is also referred to as the num_inter_layer_ref_pic_sets-th candidate inter-layer RPS in the semantics specified in the remainder of this subclause.

(b) Otherwise if the syntax structure is present in an SPS, then the inter_layer_ref_pic_set (stRpsIdx) syntax structure specifies a candidate inter_layer RPS, and the term "the current picture" in the semantics specified in the remainder of this subclause refers to each picture that has inter_layer_ref_pic_set_idx equal to stRpsIdx in a CVS that has the SPS as the active SPS.

It will be noted that the value num_inter_layer_ref_pics_minus1 plus 1 specifies the number of pictures that may be used in decoding of the current picture for inter-layer prediction. The length of the num_inter_layer_ref_pics_minus1 syntax element is Ceil(Log 2(NumDirectRefLayers[nuh_layer_id])) bits. The value of num_inter_layer_ref_pics_minus1 shall be in the range of 0 to NumDirectRefLayers[nuh_layer_id]−1, inclusive. When not present, the value of num_inter_layer_ref_pics_minus1 is inferred to be equal to 0.

In at least one embodiment, the variable NumActiveRefLayerPics is derived as follows:

```
if( nuh_layer_id = = 0 | | NumDirectRefLayers[ nuh_layer_id ] = = 0 |
| !inter_layer_pred_enabled_flag )
    NumActiveRefLayerPics = 0
else if( max_one_active_ref_layer_flag | | NumDirectRefLayers[
nuh_layer_id ] = = 1 )
    NumActiveRefLayerPics = 1
else
    NumActiveRefLayerPics = num_inter_layer_ref_pics_minus1 + 1
```

All slices of a coded picture shall have the same value of NumActiveRefLayerPics.

It should be appreciated that if NumActiveRefLayerPics is equal to NumDirectRefLayers[nuh_layer_id], then it is not necessary to send the syntax structure inter_layer_ref_pic_set (stRpsIdx).

The variable inter_layer_pred_layer_idc[i] specifies the variable, RefPicLayerId[i], representing the nuh_layer_id of the i-th picture that may be used by the current picture for inter-layer prediction. The length of the syntax element inter_layer_pred_layer_idc[i] is Ceil(Log 2(NumDirectRefLayers[nuh_layer_id])) bits. The value of inter_layer_pred_layer_idc[i] is preferably in the range of 0 to NumDirectRefLayers[nuh_layer_id]−1, inclusive. When not present, the value of inter_layer_pred_layer_idc[i] is inferred to be equal to i.

When i is greater than 0, inter_layer_pred_layer_idc[i] shall be greater than inter_layer_pred_layer_idc[i−1].

The variables RefPicLayerId[i] for each value of i in the range of 0 to NumActiveRefLayerPics−1, inclusive, NumActiveMotionPredRefLayers, and ActiveMotionPredRefLayerId[j] for each value of j in the range of 0 to NumActiveMotionPredRefLayers−1, inclusive, are derived as follows:

```
for( i = 0, j = 0; i < NumActiveRefLayerPics; i++)
RefPicLayerId[ i ] = RefLayerId [ nuh_layer_id ][
inter_layer_pred_layer_idc[ i ] ]
if ( MotionPredEnabledFlag [ nuh_layer_id ][
inter_layer_pred_layer_idc[ i ] ] )
ActiveMotionPredRefLayerId[ j++ ] = RefLayerId [ nuh_layer_id ][
inter_layer_pred_layer_idc[ i ] ]
}
NumActiveMotionPredRefLayers = j
```

All slices of a picture shall have the same value of inter_layer_pred_layer_idc[i] for each value of i in the range of 0 to NumActiveRefLayerPics−1, inclusive.

It is a requirement of bitstream conformance that for each value of i in the range of 0 to NumActiveRefLayerPics−1, inclusive, either of the following two conditions shall be true:

(1) The value of max_tid_il_ref_pics_plus1[LayerIdxInVps[RefPicLayerId[i] ] ] is greater than TemporalId.

(2) The values of max_tid_il_ref_pics_plus1 [LayerIdxInVps[RefPicLayerId[i] ] ] and TemporalId are both equal to 0 and the picture in the current access unit with nuh_layer_id equal to RefPicLayerId[i] is an IRAP picture.

It is a requirement of bitstream conformance that for each value of i in the range of 0 to NumActiveRefLayerPics−1, inclusive, the value of SamplePredEnabledFlag[nuh_layer_id] [RefPicLayerId[i]] or MotionPredEnabledFlag [nuh_layer_id] [RefPicLayerId[i]] shall be equal to 1.

FIG. 6 illustrates an example coding embodiment (lines 01-32) of changes to a general slice segment header syntax utilizing the inter-layer reference picture set. It will be noted that this represents the addition of processing the inter-layer picture set, in lines 22 through 26 of the figure, to the coding example seen in FIG. 2.

In describing slice segment header semantics, it should be appreciated that inter_layer_ref_pic_set_sps_flag equal to 1 specifies that the inter-layer RPS of the current picture is derived based on one of the inter_layer_ref_pic_set( ) syntax structures in the active SPS that is identified by the syntax element inter_layer_ref_pic_set_idx in the slice header. However, if inter_layer_ref_pic_set_sps_flag equals to 0, this specifies that the inter-layer RPS of the current picture is derived based on the inter_layer_ref_pic_set( ) syntax structure that is directly included in the slice headers of the current picture. When num_inter_layer_ref_pic_sets is equal to 0, the value of inter_layer_ref_pic_set_sps_flag shall be equal to 0.

The variable inter_layer_ref_pic_set_idx specifies an index variable, into the list of the inter_layer_ref_pic_set( ) syntax structures included in the active SPS, of the inter_layer_ref_pic_set( ) syntax structure that is used for derivation of the inter-layer RPS of the current picture. The syntax element inter_layer_ref_pic_set_idx is represented by Ceil(Log 2(num_inter_layer_ref_pic_sets)) bits. When not present, the value of inter_layer_ref_pic_set_idx is inferred to be equal to 0. The value of inter_layer_ref_pic_set_idx shall be in the range of 0 to num_inter_layer_ref_pic_sets−1, inclusive.

The variable CurrRpsIdx is derived as follows:
If inter_layer_ref_pic_set_sps_flag is equal to 1, CurrRpsIdx is set equal to inter_layer_ref_pic_set_idx.

Otherwise, CurrRpsIdx is set equal to num_inter_layer_ref_pic_sets.

3. Inter-Layer Sample only Prediction and TMVP Interaction.

In another portion of the present technology a check is performed that the inter_layer_sample_pred_only_flag is false before signaling collocated_ref related syntax. It will be noted that TMVP is the acronym for "temporal motion vector prediction".

The present technology considers that since motion vectors from inter layer reference pictures are constrained to be zero motion only, an SHVC encoder should preferably disable temporal motion vector prediction for the current picture, by setting slice_temporal_mvp_enabled_flag to zero, when only inter-layer reference pictures exist in the reference picture lists of all slices in the current picture. This syntax change avoids the need to send any additional syntax elements, such as collocated_from_l0_flag and collocated_ref_idx.

Figure 7:
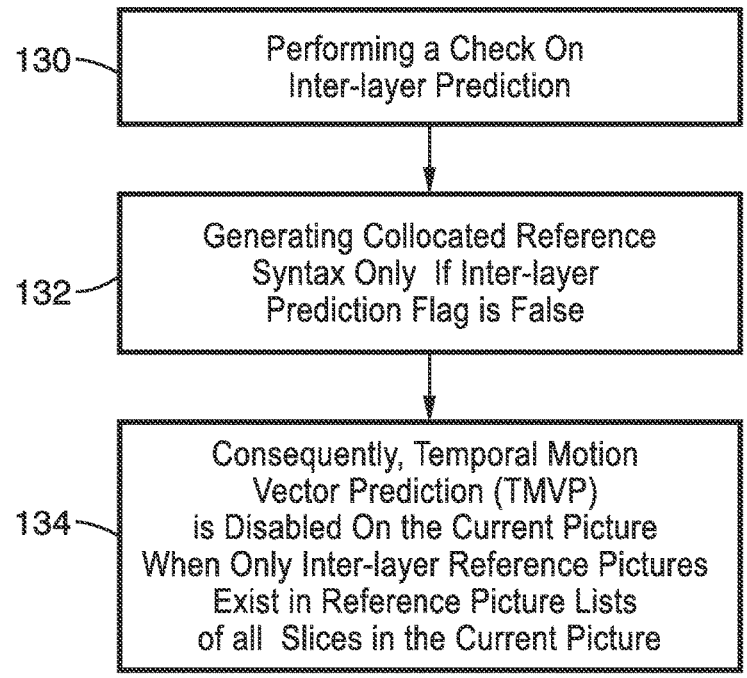
FIG. 7 is a flow diagram of inter-layer sample only prediction and TMVP interaction, according to an embodiment of the present description.

FIG. 7 is a flow diagram of disabling temporal motion vector prediction according to an embodiment of the present technology. A check is performing 130 on inter-layer prediction, such as inter_layer_sample_pred_only_flag. Collocated reference syntax, then is only generated 132, if the inter-layer prediction flag is false. The result is that Temporal Motion Vector Prediction (TMVP) is disabled 134 on the current picture when only inter-layer reference pictures exist in reference picture lists of all slices in the current picture.

According to the current draft of the HEVC (at the time filing this application), when inter_layer_sample_pred_only_flag is TRUE, no inter prediction is utilized. Coding units (CUs) can either be intra mode or inter mode coded with zero MV, since inter-layer sample prediction is performed through a reference list including only up-sampled referenced layer picture. It was agreed by the experts group to use "zero MV" in the current reference software for inter-layer sample prediction, because the reference is just the resampled version of a lower resolution picture.

In MV coding of HEVC, TMVP is placed after spatial neighboring MVs in both the merge list and advanced motion vector prediction (AMVP) list. When inter_layer_sample_pred_only_flag is TRUE, then all available spatial neighboring MVs are zeroes, except for TMVP (up-scaled from reference layer) which may have non-zero MVs.

Figure 8:
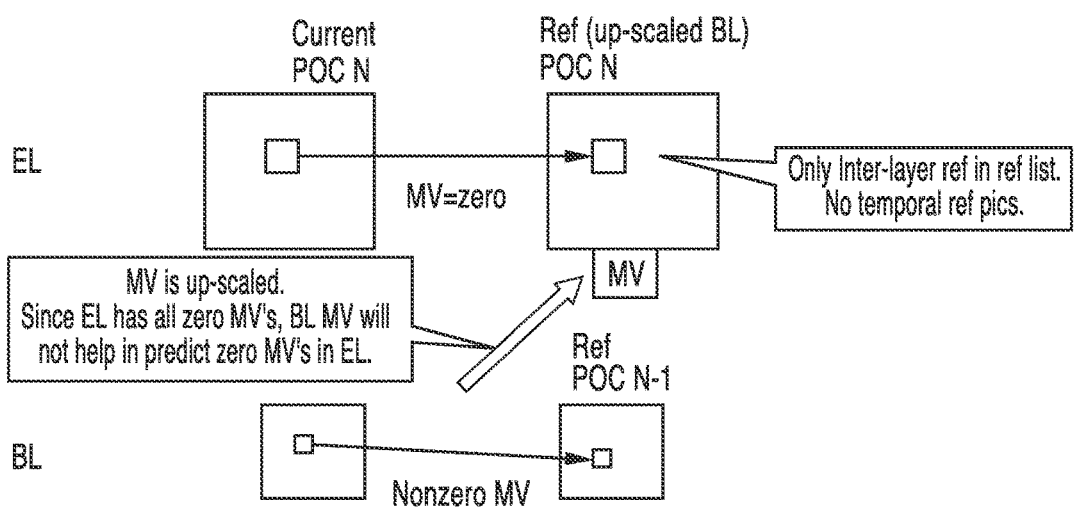
FIG. 8 is a block diagram of inter-layer sample only prediction and TMVP interaction according to an embodiment of the present description.

FIG. 8 illustrates an example embodiment of inter-layer sample only prediction and TMVP interaction. The figure depicts non-zero motion vectors (MVs) during TMVP, showing an enhancement layer (EL) at the top over a base layer (BL) at the bottom. The current picture order count (POC) is shown at the left with a reference POC at the right, with EL layer based on upscaled BL. It will be seen that the MV is upscaled into the upscaled BL of the EL, seen in the upper right.

In the current HEVC draft, a PU (with zero MV) could select TMVP as the predicator at the cost of a larger index number and possible non-zero MVD. The technology, however, considers that it can be more efficient for a PU having zero MV, to select spatial candidates with a smaller index and zero MVD. This change increases efficiency and can always be performed in coding MVs for this scenario, because all available spatial neighboring MVs are zeroes. So TMVP is not necessarily helpful in this scenario. In addition, TMVP in this scenario requires MV up-scaling from the reference layer at the price of computational complexity and memory accesses.

Accordingly, for the sake of simple processing and efficiency in MV coding, it is proposed to skip TMVP related syntax and related processing when inter_layer_sample_pred_only_flag is TRUE.

FIG. 9 illustrates example coding of syntax modification, as seen in lines 5-11, as applied to the slice segment header. It should be appreciated that the above can be applied in combination with the method previously described in Section 1.1 or Section 1.2.

FIG. 10 illustrates an alternative to FIG. 9, but using an internal variable InterLayerSamplePredOnlyFlag, which is derived from the number of inter reference pictures and used for the condition to determine whether to send TMVP syntax instead of checking inter_layer_sample_pred_only_flag. InterLayerSamplePredOnlyFlag, is derived as follows. The changes are seen in lines 5-11 of the figure.

If NumPocStCurrBefore is equal to 0, then NumPocStCurrAfter is equal to 0 and NumPocLtCurr is equal to 0, whereby InterLayerSamplePredOnlyFlag is set to 1; Otherwise, InterLayerSamplePredOnlyFlag is set to 0.

It should be appreciated that the exact syntax of the above operation is not necessary (required), because SHVC standard adopts this idea as a Note for the encoder as follows. "NOTE—Because bitstreams conforming to this Annex are constrained to allow only zero-valued motion vectors for inter prediction using inter layer reference pictures, it is suggested that a scalable encoder should disable temporal motion vector prediction for the current picture (by setting slice_temporal_mvp_enabled_flag to zero) when the reference picture lists of all slices in the current picture include only inter-layer reference pictures. This way, the encoder would be able to avoid the need to send the slice segment header syntax elements collocated_from_l0_flag and collocated_ref_idx."

Figure 11:
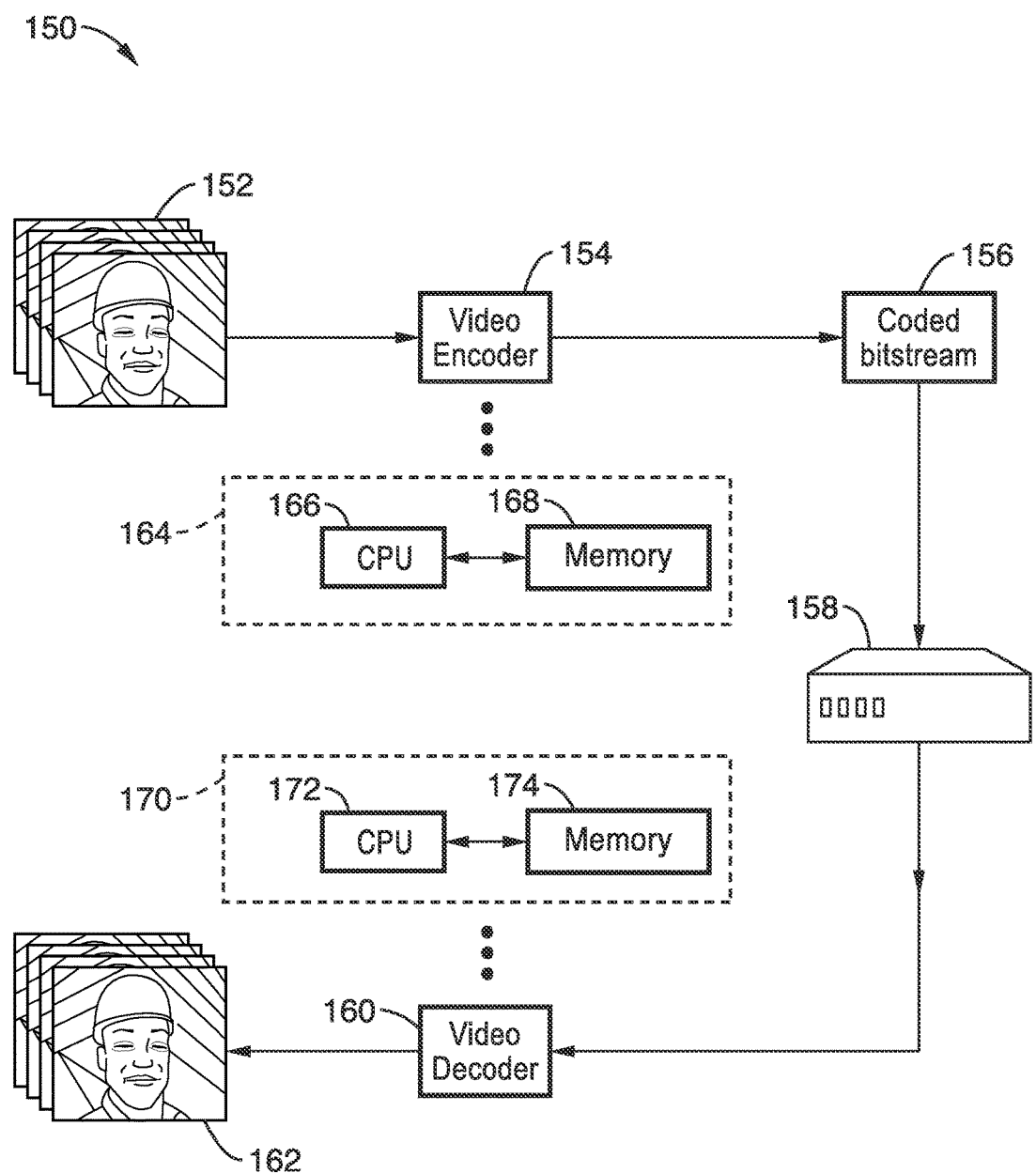
FIG. 11 is a block diagram of an encoder-decoder system shown with associated processors and memory for program execution, according to an embodiment of the present description.

FIG. 11 illustrates an example embodiment 150 of HEVC encoding and decoding. A sequence of frames 152 is seen received by the video encoder 154, which outputs a coded bitstream 156 for storage/distribution 158. On playback, the encoded video is received by video decoder 160 which outputs a reconstructed sequence of frames 162. It will be appreciated that the present technology is preferably performed in response to programming which executes on at least one processing element in the video encoder, and/or decoder. These processing elements are seen 164, 170, each comprising at least one processor 166, 172 (e.g., microprocessor, microcontroller, digital signal processor (DSP), or similar), and memory 168, 174 (e.g., solid state memory and/or other computer-readable media). Instructions stored in each of the memories 168, 174, are configured for execution on the respective processors 166, 172. The present technology is non-limiting with regard to memory and computer-readable media, insofar as these are non-transitory, and thus not constituting a transitory electronic signal.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the description herein, it will be appreciated that that the present disclosure encompasses multiple embodiments which include, but are not limited to, the following:

1. A video coding apparatus, comprising: (a) at least one computer processor; and (b) programming executable on said at least one computer processor for removing redundancy in an inter-layer operations by performing steps comprising: (i) removing redundancy in an inter-layer prediction syntax by configuring inter-layer prediction so that it is only performed for P or B types of slices, and performing inter-layer prediction when the number of reference layers differs between the sequence and picture level; and (ii) eliminating unnecessary temporal motion vector prediction (TMVP), by generating collocated reference syntax only if inter-layer prediction flag is false, whereby TMVP is disabled on a current picture when only inter-layer reference pictures exist in reference picture lists of all slices in the current picture, because motion vectors from inter layer reference pictures are constrained to be zero motion only.

2. The apparatus of any preceding embodiment, wherein said encoder comprises an encoder configured according to a high efficiency video coding (HEVC) standard.

3. The apparatus of any preceding embodiment, wherein said programming executable on said at least one computer processor is configured for eliminating a selection of which layer to refer to when the number of reference layers is the same between the number of direct reference layers (NumDirectRefLayers[nuh_layer_id] (sequence-level)) and the number of active reference layers (NumActiveRefLayerPics (picture-level)).

4. The apparatus of any preceding embodiment, further comprising programming executable on said at least one computer processor for performing said inter-layer prediction comprising: (a) comparing number of direct reference layers (NumDirectRefLayers[nuh_layer_id]) for non-equality to number of active reference layers (NumActiveRefLayerPics); and (b) performing inter-layer prediction using inter_layer_pred_layer[i], for each of the active reference layer pictures [i].

5. The apparatus of any preceding embodiment, wherein inter_layer_pred_layer_idc[i] has a length is Ceil(Log 2(NumDirectRefLayers[nuh_layer_id])) bits.

6. The apparatus of any preceding embodiment, wherein said encoder comprises a scalable HEVC encoder (SHVC).

7. The apparatus of any preceding embodiment, wherein said TMVP is disabled for a current picture, by setting slice_temporal_mvp_enabled_flag to zero, when only inter-layer reference pictures exist in reference picture lists of all slices in the current picture.

8. The apparatus of any preceding embodiment, wherein conditions on generating said collocated reference syntax eliminates sending any additional syntax elements, including collocated_from_I0_flag and collocated_ref_idx.

9. A video coding apparatus, comprising: (a) at least one computer processor; and (b) programming executable on said at least one computer processor for removing redundancy in an inter-layer prediction syntax by performing steps comprising: (i) performing slice type checking to determine if it is an P or B type of slice; (ii) configuring inter-layer prediction so that it can only be performed for P or B types of slices; and (iii) performing inter-layer prediction when number of reference layers differs between sequence and picture level.

10. The apparatus of any preceding embodiment, wherein said programming executable on said at least one computer processor is configured for eliminating specification of which layer to refer to when number of reference layers is equal between NumDirectRefLayers[nuh_layer_id] (sequence-level) and NumActiveRefLayerPics (picture-level).

11. The apparatus of any preceding embodiment, further comprising programming executable on said at least one computer processor for performing said inter-layer prediction comprising: (a) comparing NumDirectRefLayers [nuh_layer_id] for non-equality to NumActiveRefLayerPics; and (b) performing inter-layer prediction using inter_layer_pred_layer[i], for each of the active reference layer pictures [i].

12. The apparatus of any preceding embodiment, wherein inter_layer_pred_layer_idc[i] has a length is Ceil(Log 2(NumDirectRefLayers[nuh_layer_id])) bits.

13. The apparatus of any preceding embodiment, wherein inter_layer_pred_layer_idc[i] can have a value in the range of 0 to NumDirectRefLayers[nuh_layer_id]−1, inclusive.

14. The apparatus of any preceding embodiment, wherein setting of an inter_layer_sample_pred_only_flag based on if(NumSamplePredRefLayers[nuh_layer_id] and NumActiveRefLayerPics are greater than zero has been removed.

15. The apparatus of any preceding embodiment, further comprising programming executable on said at least one computer processor for eliminating unnecessary TMVP syntax and related processing in response to steps comprising: (i) performing a check on an inter-layer prediction flag; and (ii) generating collocated reference syntax only if inter-layer prediction flag is false, whereby TMVP is disabled on a current picture when only inter-layer reference pictures exist in the reference picture lists of all slices in the current picture, because motion vectors from inter layer reference pictures are constrained to be zero motion only.

16. A video coding apparatus, comprising: (a) at least one computer processor; and (b) programming executable on said at least one computer processor for removing redundancy in an inter-layer sample only prediction and temporal motion vector prediction (TMVP) interaction by performing steps comprising: (i) performing a check on an inter-layer prediction flag; and (ii) generating collocated reference syntax only if inter-layer prediction flag is false, whereby TMVP is disabled on a current picture when only inter-layer reference pictures exist in the reference picture lists of all slices in the current picture, because motion vectors from inter layer reference pictures are constrained to be zero motion only.

17. The apparatus of any preceding embodiment, wherein said encoder comprises a scalable HEVC encoder (SHVC).

18. The apparatus of any preceding embodiment, wherein said TMVP is disabled for the current picture, by setting slice_temporal_mvp_enabled_flag to zero, when only inter-layer reference pictures exist in the reference picture lists of all slices in the current picture.

19. The apparatus of any preceding embodiment, wherein conditions on generating said collocated reference syntax eliminates sending any additional syntax elements, including collocated_from_IO_flag and collocated_ref_idx.

20. The apparatus of any preceding embodiment, further comprising programming executable on said at least one computer processor for removing redundancy in an inter-layer prediction syntax by performing steps comprising: (a) performing slice type checking to determine if it is an P or B type of slice; (b) configuring inter-layer prediction so that it can only be performed for P or B types of slices; and (c) performing inter-layer prediction when existing number of reference layers differs between a sequence and picture level.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A video coding apparatus, comprising:
    at least one processor configured to:
        check a slice type to determine one of a P-type slice or a B-type slice;
        configure an inter-layer prediction for one of the P-type slice or the B-type slice;
        execute the inter-layer prediction based on a difference in a number of reference layers between a sequence level and a picture level;
        determine that reference picture lists of all slices in a current picture include only inter-layer reference pictures, based on an inter_layer_sample_pred_only_flag and the execution of the inter-layer prediction;
        disable a temporal motion vector prediction (TMVP) for the current picture by use of a slice_temporal_mvp_enabled_flag, based on the determination that the reference picture lists of all the slices in the current picture include only the inter-layer reference pictures; and
        skip each of a syntax associated with the TMVP and an operation associated with the TMVP, based on:
            the TMVP that is disabled; and
            the reference picture lists of all the slices in the current picture that include only the inter-layer reference pictures.

2. The video coding apparatus recited in claim 1, wherein the at least one processor is further configured to disable the TMVP for the current picture based on the slice_temporal_mvp_enabled_flag that is set to zero.

3. The video coding apparatus recited in claim 1, wherein the at least one processor is further configured to skip each of the syntax associated with the TMVP and the operation associated with the TMVP based on a determination that the inter_layer_sample_pred_only_flag is set to true.

4. A video coding method, comprising
in a video coding apparatus:
    checking a slice type to determine one of a P-type slice or a B-type slice;
    configuring an inter-layer prediction for one of the P-type slice or the B-type slice;
    executing the inter-layer prediction based on a difference in a number of reference layers between a sequence level and a picture level;
    determining that reference picture lists of all slices in a current picture include only inter-layer reference pictures, based on an inter_layer_sample_pred_only_flag and the execution of the inter-layer prediction;
    disabling a temporal motion vector prediction (TMVP) for the current picture by using a slice_temporal_mvp_enabled_flag, based on the determination that the reference picture lists of all the slices in the current picture include only the inter-layer reference pictures; and
    skipping each of a syntax associated with the TMVP and an operation associated with the TMVP, based on:
        the TMVP that is disabled; and
        the reference picture lists of all the slices in the current picture that include only the inter-layer reference pictures.

5. The video coding method recited in claim 4, wherein each of the syntax associated with the TMVP and the operation associated with the TMVP is skipped based on the slice_temporal_mvp_enabled_flag that is set to zero.

* * * * *